(12) United States Patent
Kim et al.

(10) Patent No.: US 8,666,127 B1
(45) Date of Patent: Mar. 4, 2014

(54) METHOD AND APPARATUS FOR FAKE FINGERPRINT DETECTION

(75) Inventors: Young-Jae Kim, Cupertino, CA (US);
Byung-Jin Lee, Campbell, CA (US);
Sang-Hoon Shin, Santa Clara, CA (US);
Daniel Riley, Kansas City, MO (US)

(73) Assignee: SecuGen Corporation, Santa Clara, CA (US)

( * ) Notice: Subject to any disclaimer, the term of this patent is extended or adjusted under 35 U.S.C. 154(b) by 243 days.

(21) Appl. No.: 13/204,446

(22) Filed: Aug. 5, 2011

Related U.S. Application Data

(60) Provisional application No. 61/371,599, filed on Aug. 6, 2010.

(51) Int. Cl.
*G06K 9/00* (2006.01)
(52) U.S. Cl.
USPC .......................................... 382/127; 382/125
(58) Field of Classification Search
USPC ................ 382/124, 125, 127; 340/5.53, 5.83
See application file for complete search history.

(56) References Cited

U.S. PATENT DOCUMENTS

| | | | |
|---|---|---|---|
| 7,394,919 B2* | 7/2008 | Rowe et al. ................... | 382/127 |
| 2002/0076089 A1* | 6/2002 | Muramatsu et al. .......... | 382/124 |
| 2005/0008197 A1* | 1/2005 | Dennis .......................... | 382/115 |
| 2007/0196003 A1* | 8/2007 | Kim et al. ..................... | 382/127 |

* cited by examiner

*Primary Examiner* — Jon Chang
(74) *Attorney, Agent, or Firm* — Silicon Valley Patent Group LLP; Thomas Chan

(57) ABSTRACT

Methods and Apparatus are provided for fake fingerprint detection. In one embodiment, an apparatus for fake fingerprint detection includes a prism having a first side configured to be touched by a fingerprint, an IR LED located near the second side of the prism, a light source located near the third side of the prism, where both the IR LED and the light source are configured to illuminate the fingerprint simultaneously to produce a captured image of the fingerprint, one or more lenses configured to direct the captured image of the fingerprint for storage, one or more CMOS sensors configured to collect the captured image of the fingerprint for analysis, and a controller configured to determine validity of the fingerprint using the captured image.

18 Claims, 13 Drawing Sheets

METHOD AND APPARATUS FOR FAKE FINGERPRINT DETECTION

CROSS REFERENCE TO RELATED APPLICATIONS

This application claims the benefit of U.S. provisional application bearing Ser. No. 61/371,599, "Method and Apparatus for Fake Fingerprint Detection," filed Aug. 6, 2010, assigned to the assignee hereof. The aforementioned United States application is hereby incorporated by reference in its entirety.

FIELD

The present invention relates to the field of fingerprint detection system. In particular, the present invention relates to method and apparatus for fake fingerprint detection.

BACKGROUND

Various fingerprint recognition devices have been used for commercial and military applications. Many of such conventional fingerprint recognition devices focus on matching patterns of a captured fingerprint to an existing database of fingerprint samples. If a match is found, the fingerprint is deemed to be valid, but if a match is not found, the fingerprint is deemed to be invalid. One of the drawbacks of such conventional fingerprint recognition devices is that they primarily focus on pattern matching and they are not able to distinguish whether the fingerprint being compared or analyzed is a real finger. In some situations, they do not have the ability to distinguish a fake fingerprint from a real fingerprint if the two have substantially the same fingerprint pattern.

Therefore, there is a need for methods and apparatuses for determining validity of fingerprints that can address the above issues of conventional fingerprint recognition devices.

SUMMARY

Methods and systems are provided for fake fingerprint detection. In one embodiment, a method for determining validity of a fingerprint includes providing a prism having a first side configured to be touched by a fingerprint, providing an IR LED located near a second side of the prism, providing a light source located near a third side of the prism, illuminating both the IR LED and the light source simultaneously to produce a captured image of the fingerprint, storing the captured image of the fingerprint for analysis, and determining validity of the fingerprint using the captured image.

In another embodiment, an apparatus for determining validity of a fingerprint includes a prism having a first side configured to be touched by a fingerprint, an IR LED located near the second side of the prism, a light source located near the third side of the prism, where both the IR LED and the light source are configured to illuminate the fingerprint simultaneously to produce a captured image of the fingerprint, one or more lenses configured to direct the captured image of the fingerprint for storage, one or more CMOS sensors configured to collect the captured image of the fingerprint for analysis, and a controller configured to determine validity of the fingerprint using the captured image.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

Like numbers are used throughout the figures.

DESCRIPTION OF EMBODIMENTS

Methods and systems are provided for fake fingerprint detection. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
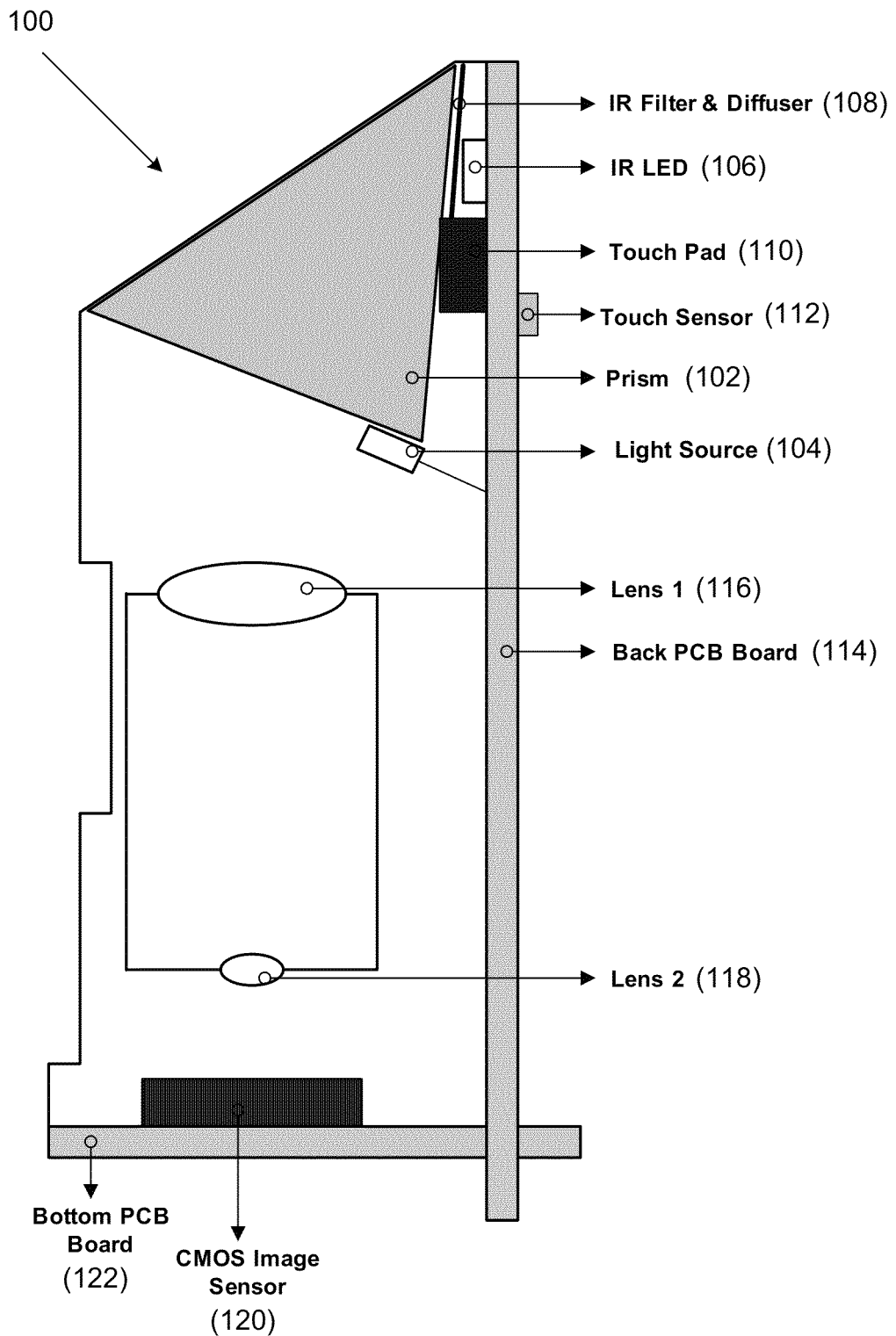
FIG. 1 illustrates a fingerprint recognition device according to embodiments of the present invention.

FIG. 1 illustrates a fingerprint recognition device according to embodiments of the present invention. In the exemplary implementation shown in FIG. 1, the fingerprint recognition device 100 includes a prism 102, a light source 104, an infrared (IR) light emitting diode (LED) 106, an IR filter and diffuser 108, a touch pad 110, a touch sensor 112, a set of lenses 116 and 118, a CMOS image sensor 120. The light source 104 may be implemented with a red LED, a white LED, or a LED capable of illuminating other colors. The fingerprint recognition device may also include one or more printed circuit boards (PCB), such as the back PCB 114, and the bottom PCB 122. However, the number and location of the PCBs may vary based on various design requirements.

According to embodiments of the present invention, the prism 102 is a transparent optical element with flat and polished surfaces. It refracts light carrying a fingerprint image (created by touching the prism), and delivers the fingerprint image via lenses 116 and 118, to the CMOS sensor 120. The light source 104 is used to generate a scattered light that illuminate the surface of fingerprint input side of the prism to create an inverse image. The IR LED 106 is used to generate a direct light that illuminates the surface of fingerprint input side of the prism to create a direct image. The captured image is a combination of the direct image and the inverse image, where the captured image is used in the process of analyzing fake finger detection. The IR filter and diffuser 108 (can also be referred to as an IR Pass Filter) is located between the prism 102 and the IR LED 106 to allow IR LED 106 light to pass into the prism and it blocks light having wavelength not in the IR range from passing through. In the example of FIG. 1, the IR filter 108 blocks light from the light source 104 from passing through in the areas covered by the IR filter 108.

The touch pad 110 is used to transmit touch signal through the prism to the touch sensor when a finger is placed on the surface of the prism. The touch sensor 112 is activated when a finger or an object that increases capacitance level, touches the prism surface of the fingerprint recognition device. The prism has a small conductive characteristic that is capable of delivering touch signal through the touch pad 110 to the touch sensor 112. The touch sensor 112 may be located anywhere on the PCB board depending on PCB design.

The lenses 116 and 118 are optical elements which transmit and refract light and the fingerprint image from the prism, and deliver it to the CMOS sensor 120. The CMOS sensor 120 captures the actual image that is placed on the prism and passed through the prism and lenses.

Figure 2:
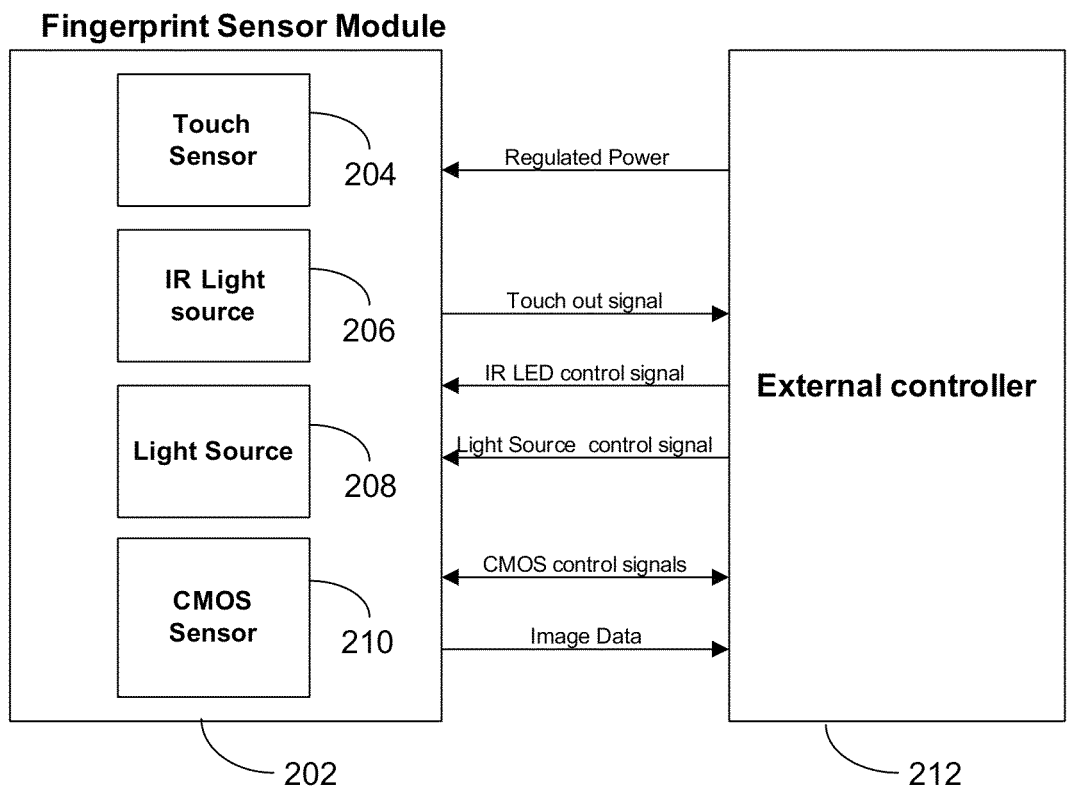
FIG. 2 illustrates a sensor module block diagram of the fingerprint recognition device of FIG. 1 according to embodiments of the present invention.

FIG. 2 illustrates a block diagram of a fingerprint sensor module according to embodiments of the present invention. In the example shown in FIG. 2, the fingerprint sensor module includes a touch sensor 204, an IR light source 206, a light source 208, and a CMOS sensor 208. The fingerprint sensor module is configured to communicate with an external controller 212, whereas various signals are transmitted between the fingerprint sensor module 202 and the external controller 212. For example, the fingerprint sensor module 202 receives regulated power, IR LED control signal, light source control signal, and certain CMOS sensor control signals from the external controller 212. On the other hand, the fingerprint sensor module provides output signals of touch sensor, image data, and certain other CMOS sensor control signals to the external controller 212.

According to embodiments of the present invention, the touch sensor 204 is activated when a finger or an object that increases capacitance level, touches on the prism surface of the fingerprint recognition device. The prism has a small conductive characteristic that delivers touch signal through the touch pad to the touch sensor. The IR light source 206 is used to illuminate the surface of fingerprint input device to create a direct image. This light source is used when analyzing fake finger detection process.

The light source 208 is used to generate a scattered light that illuminates the surface of fingerprint input device to create an inverse image of the fingerprint. Since the light source 208 and the IR light source 206 are illuminated at the same time, the captured image of the fingerprint is a combination of a direct image generated by the IR LED light and an inverse image generated by the light source 208. The captured image is used for analyzing fake finger detection. The CMOS sensor 210 captures the actual image that is placed on the prism and passed through the prism and lenses.

Figure 3:
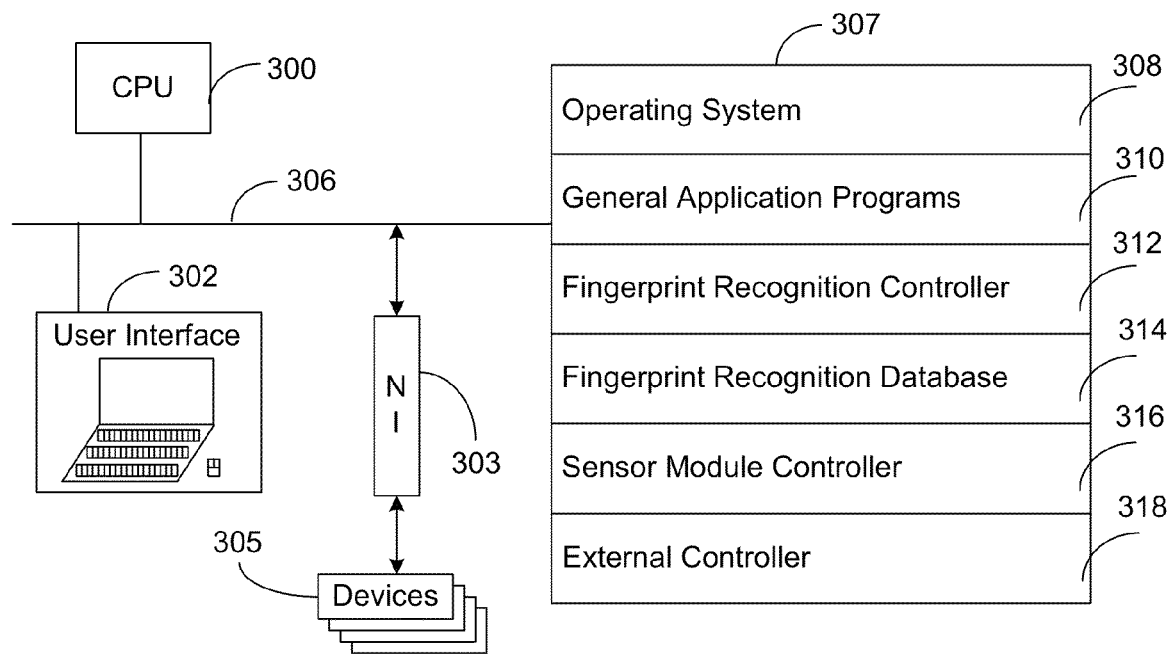
FIG. 3 illustrates a system configured to work with the fingerprint recognition device of FIG. 1 according to embodiments of the present invention.

FIG. 3 illustrates a computer system configured to work with the fingerprint recognition device of FIG. 1 according to embodiments of the present invention. The computer system includes one or more central processing units (CPUs) 300, at least a user interface 302, a memory device 304, a system bus 306, and one or more bus interfaces for connecting the CPU, user interface, memory device, and system bus together. The computer system also includes at least one network interface 303 for communicating with other devices 305 on a computer network, for example, one of such devices can be the fingerprint recognition device as disclosed by the present invention.

The memory device 307 may include high-speed random-access memory and may also include non-volatile memory, such as one or more magnetic disk storage devices. The memory device 307 may also include mass storage that is remotely located from the CPU(s) 300. The memory device 307 preferably stores:

an operating system 308 that includes procedures for handling various basic system services and for performing hardware-dependent tasks;

general application programs 310 for performing user-defined applications, tasks, and searchers;

fingerprint recognition controller for controlling and performing fingerprint recognition detection;

fingerprint recognition database 314 for use with the fingerprint recognition controller;

sensor module controller 316 for controlling the sensing of the input fingerprint; and external controller 318 for controlling other functions of the fingerprint recognition device.

The above mentioned programs and databases may include executable procedures, sub-modules, tables, and other data structures. In other embodiments, additional or different modules and data structures may be used, and some of the modules and/or data structures listed above may not be used.

Figure 4:
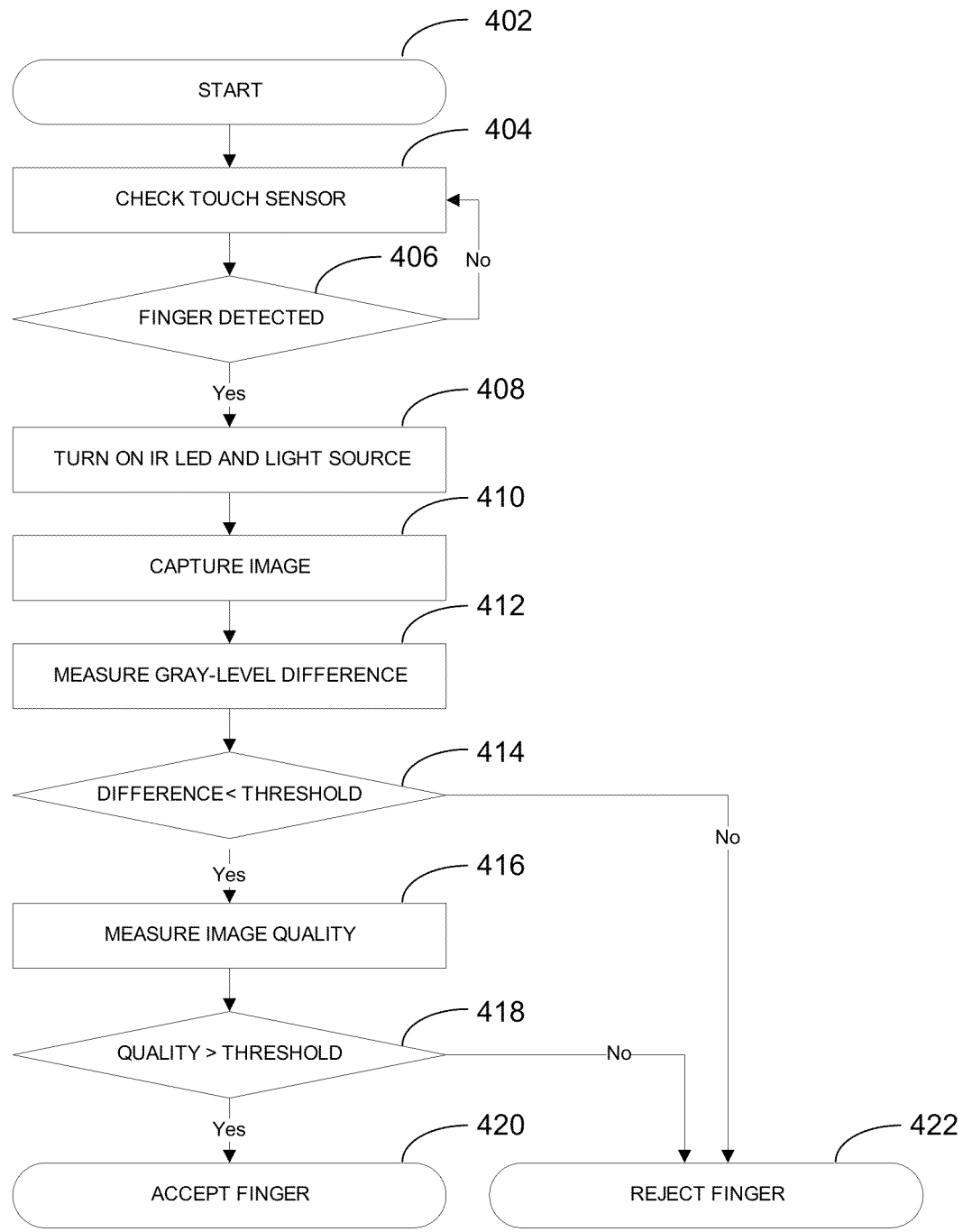
FIG. 4 illustrates a method for detecting a fake fingerprint according to embodiments of the present invention.

FIG. 4 illustrates a method for detecting a fake fingerprint according to embodiments of the present invention. The method starts in block 402 and moves to block 404 where the method checks the touch sensor of the fingerprint detection device. In block 406, a first determination is made as to whether a finger is detected. If a finger is detected (406_Yes), the method moves on to block 408. Alternatively, if a finger is not detected (406_No), the method returns to block 404, and continues to check the touch sensor for sensing whether the fingerprint detection device is touched by a finger. The touch sensor is activated only when a finger or an object that increases capacitance level, touches the surface of the fingerprint sensor. This function of the fingerprint detection device is used to distinguish between a real finger and a fake finger made by rubber or silicon material.

In block 408, the method turns on both the IRLED and the light source of the fingerprint detection device. With these two light sources being illuminated, the method captures both a direct image of the fingerprint and an inverse image of the fingerprint simultaneously in block 410 to form a single captured image. In block 412, the method measures the differences between the gray-level of the captured image with a first predetermined threshold value. Also, the method measures the rate of pixel variations of the captured image with a second predetermined threshold value. In block 414, a second determination is made as to whether the differences between the gray-level captured for the captured image as well as the rate of pixel variations of the captured image is less than its corresponding predetermined threshold values. If the difference is less than the corresponding predetermined threshold value (414_Yes), the method moves to block 416. Alternatively, if the difference is not less than (greater or equal to) the corresponding predetermined threshold value (414_No), the method moves to block 422. According to embodiments of the present invention, measuring gray level differences as well as the rate of pixel variations of the captured image (shown as TEST1 and TEST2 in FIGS. 6-9) are used to distinguish between a real finger and a fake finger printed on a paper or film. For this purpose, both IR LED and light source are illuminated simultaneously to capture both the direct image and the inverse image of the fingerprint to form a single captured image. In one approach, when the differences between the gray-level captured for the captured image is less than the first predetermined threshold, the test (Test 1) for the captured image is deemed to be passed. Similarly, when the rate of pixel variations for the captured image is less than the second predetermined threshold, the test (Test 2) for the captured image is deemed to be passed.

In block 418, a third determination is made as to whether the quality of the captured image is higher than a third predetermined threshold. If the quality of the captured image is higher than the third predetermined threshold (418_Yes), the method moves to block 420. In the alternative, if the quality of the captured image is lower than the third predetermined threshold (418_No), the method moves to 422. In one approach, this step is to measure the image quality. After touch sensor (first determination 406) and gray level difference (second determination 414) tests have been passed, this step measures the quality of a fingerprint image and the method only allows the test (Test 3) to pass when the direct image of the fingerprint captured shows higher quality than the third predetermined threshold. In block 420, the method accepts the finger, which means the finger passes the three tests (Test 1, Test 2, and Test 3) described above. In block 422, the method rejects the finger, which means the finger fails one of the three tests (Test 1, Test 2, and Test 3) described above. The method ends in either block 420 or 422.

FIGS. 5-9 illustrate a series of user interfaces for controlling the fingerprint recognition device and communicating results of fingerprint recognition according to embodiments of the present invention.

Figure 5:
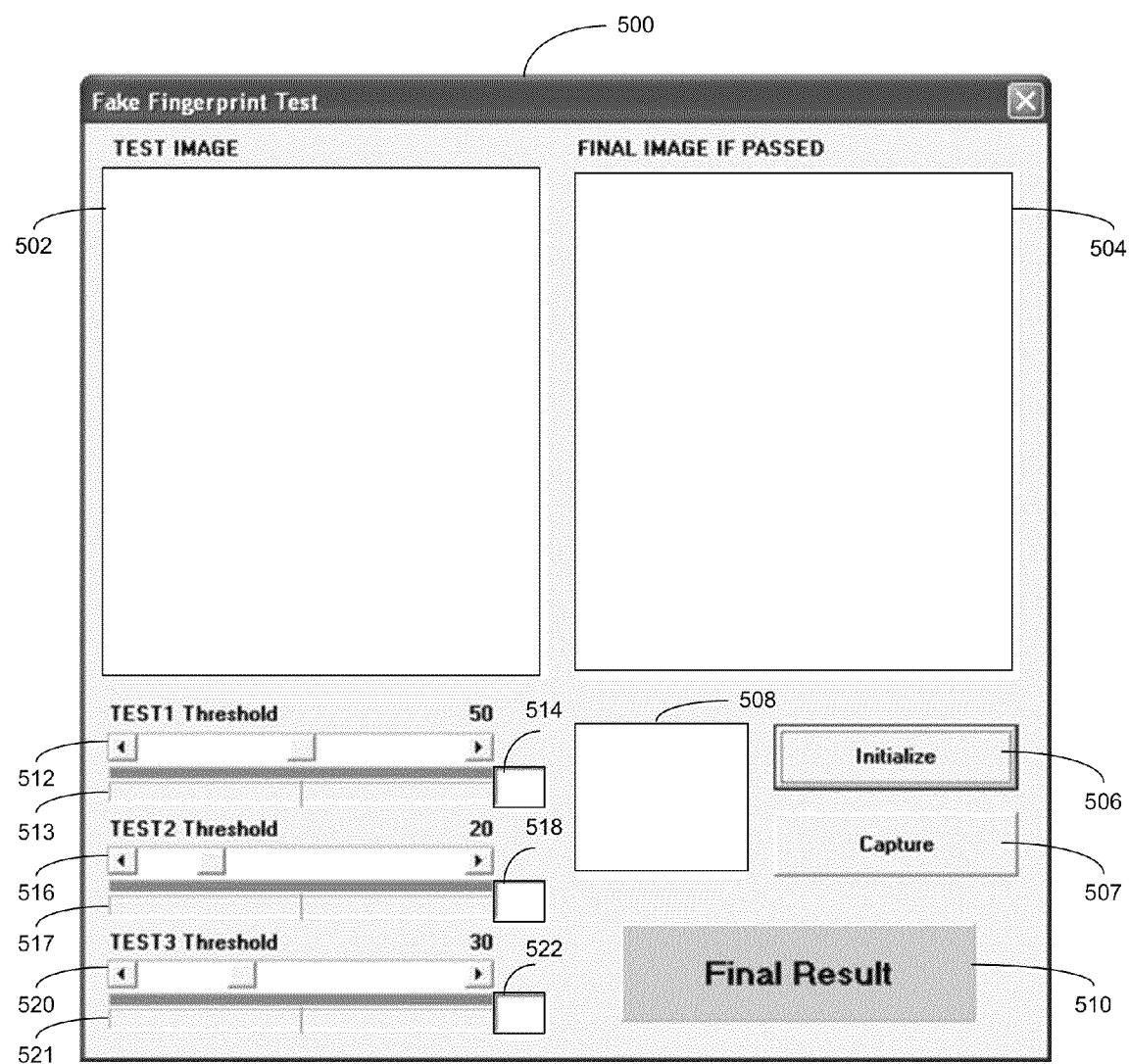
FIGS. 5-9 illustrate a series of user interfaces for controlling/using the fingerprint recognition device and communicating results of fingerprint recognition according to embodiments of the present invention.

FIG. 5 illustrates a user interface used for fake fingerprint detection according to an embodiment of the present invention. In the implementation shown in FIG. 5, the user interface 500 includes a first window 502 for showing the test image, a second window 504 for showing the final image if it passed subsequent tests, an initialize button 506 for initializing the fingerprint detection process, a capture button 507 for capturing an image (with both IR LED 106 and light source 104 on) of a fingerprint under test, a preview window 508 for showing an image of an area of the fingerprint under test, and a final result window 510 for showing a determination of the fingerprint detection tests.

The test image shown in the first window 502 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image if passed shown in the second window 504 displays the final fingerprint image captured from the fingerprint sensor when test results described below are successful. In this case, only light source 104 is turned on.

According to embodiments of the present invention, there are three different tests conducted to analyze and determine whether a fingerprint is real or fake. Each test has its corresponding threshold value to determine the outcome of each test. For example, Test 1 and Test 2 are configured to measure differences in gray-level between the base image and the image captured from the fingerprint sensor ("test image") in certain area that is affected by both IR LED 106 and light source 104 ("test area"). The base image can be a certain fixed size of blank image (shown in white) in test area, or for more accurate result, it can be pre-captured when nothing is placed on the fingerprint sensor and white parts in test area (for example>250 gray level) can be used as the base image.

In one approach, Test 1 measures the average of gray level difference between base image and the test image in test area. To pass this test, the result value has to be lower than the threshold value. A first adjustable sliding bar 512 is used to indicate the first predetermined threshold value set for Test 1. And the corresponding first sliding window 513 and numeric window 514 indicate the threshold level of the actual captured fingerprint image for Test 1. Test 2 measures the rate of pixels on the captured fingerprint image that is darker than the base image in test area. In one approach, the "darker" may mean a difference of 10 or more levels of gray between the captured fingerprint image and the base image. This threshold difference in gray level is configurable by the user. For example, if there are 5 pixels, having gray level values 244, 245, 246, 247 and 248 are compared to a base image, if only two of the pixels having gray level values higher than the threshold difference (i.e. 10), then the rate of pixels higher than the threshold difference is 2 out of 5. To pass this test, the result value has to be lower than the threshold value. A second adjustable sliding bar 516 is used to indicate the second predetermined threshold value set for Test 2. And the corresponding second sliding window 517 and numeric window 518 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 520 is used to indicate the third predetermined threshold value set for Test 3. And the corresponding third sliding window 521 and numeric window 522 indicate the actual captured fingerprint image for Test 3.

As shown in this example, the initialize button 506 makes the connection and initializes the fingerprint sensor device. The capture button 507 captures an image from the fingerprint sensor and performs three different tests and displays the final result. The preview window 508 shows an image of an area of the fingerprint under test. The final result button 510 displays the final result that may indicate whether the fingerprint being tested is PASSED or REJECTED. All three tests have to be passed to receive the PASSED final result.

Figure 6:
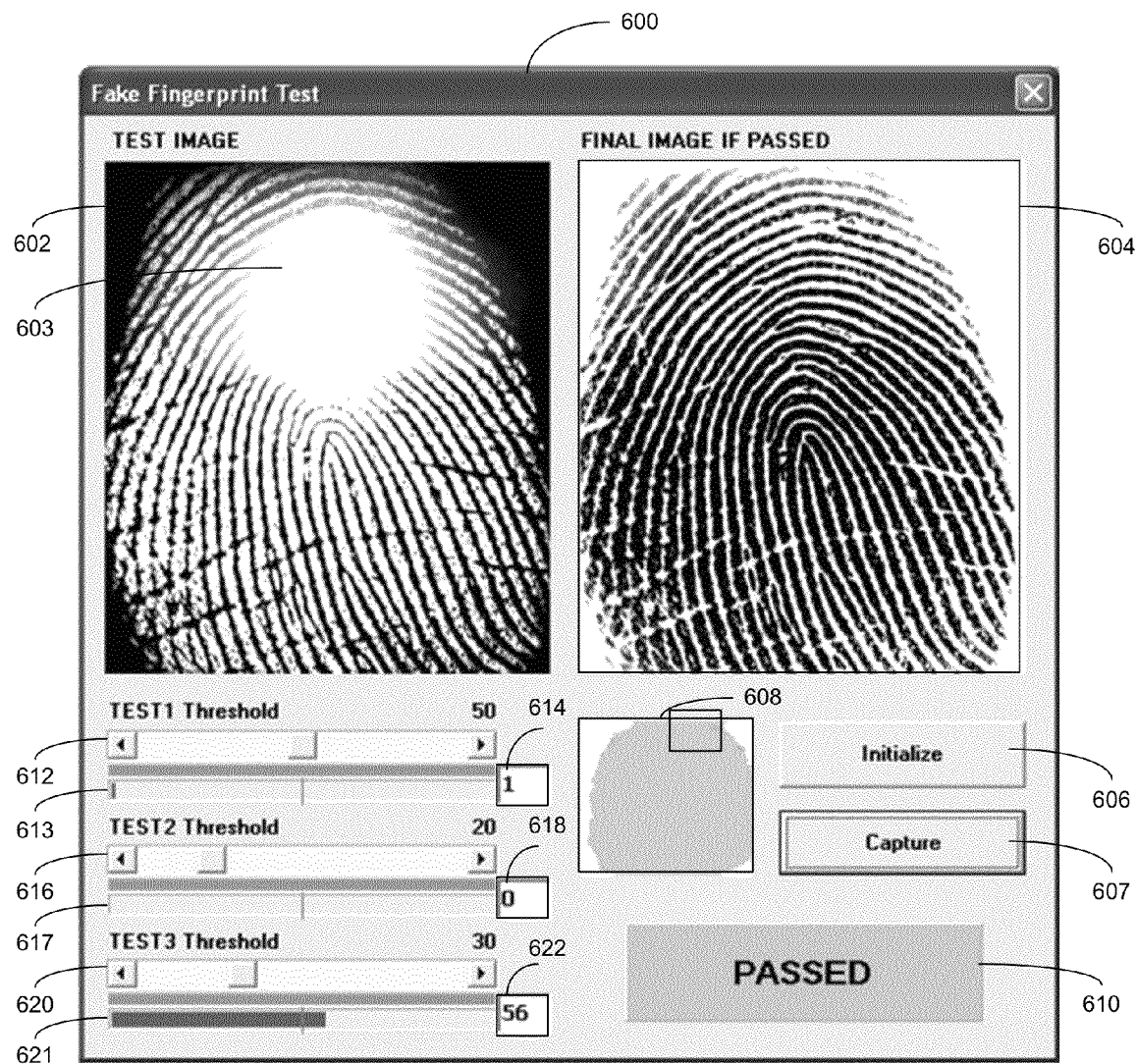

FIG. 6 illustrate another user interface used for fake fingerprint detection according to an embodiment of the present invention. In the implementation shown in FIG. 6, the user interface 600 includes a first window 602 for showing the test image, a second window 604 for showing the final image if it passed subsequent tests, an initialize button 606 for initializing the fingerprint detection process, a capture button 607 for manually capturing direct and inverse images of a fingerprint under test, a preview window 608 for showing an image of an area of the fingerprint under test, and a final result window 610 for showing a determination of the fingerprint detection tests.

The test image shown in the first window 602 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image is shown in the second window 604 displays the final fingerprint image captured from the fingerprint sensor when test results described below are successful.

In the example shown in FIG. 6, Test 1 measures the average of gray level difference between base image and the test image in test area. To pass this test, the result value has to be lower than the threshold value. A first adjustable sliding bar 612 is used to indicate the first predetermined threshold value set for Test 1. And the corresponding first sliding window 613 and numeric window 614 indicate the threshold level of the actual captured fingerprint image for Test 1. Test 2 measures the rate of pixels on the captured fingerprint image darker than the base image in test area. To pass this test, the result value has to be lower than the threshold value. A second adjustable sliding bar 616 is used to indicate the second predetermined threshold value set for Test 2. And the corresponding second sliding window 617 and numeric window 618 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 620 is used to indicate the third predetermined threshold value set for Test 3. And the corresponding third sliding window 621 and numeric window 622 indicate the actual captured fingerprint image for Test 3.

In this example, the initialize button 606 makes the connection and initializes the fingerprint sensor device. The capture button 607 captures an image from the fingerprint sensor and performs three different tests and displays the final result. The preview window 608 shows an image of an area of the fingerprint under test. The final result button 610 displays the final result that may indicate whether the fingerprint being tested is PASSED or REJECTED. All three tests have to be passed to receive the PASSED final result 610.

As shown in FIG. 6, 602 is the image captured with both the IR LED 106 and light source 104 on, but only white portion 603 on top center is lighted by both lights and other area is lighted by only the light source 104. So, only the white portion 603 is used for analyzing, which is represented by the gray part in 608. When illuminated by both lights, if a real finger placed on the prism, the light source 104 generates a scattered light and which tends to create an inverse image of the fingerprint, for simplicity represented by 010101. While the IR LED generates a direct light and which tends to create a direct image of the fingerprint, for simplicity represented by 101010. The combination of both images creates 010101+101010=111111. On the other hand, if a fake finger with wet paper is placed on the prism, both the IR LED 106 and light source 104 tend to create a direct image, 010101, and the image captured by the combination of the two lights would be 010101. Therefore, the fake fingerprint is distinguished from the real fingerprint. Note that, for illustration purposes, 0s and 1s are used in the above explanation. In other implementations, different gray levels, for example 256 gray levels, from 0 to 255, may be used to represent each pixel. In the preview window 608, gray color is used to represent the test area, where most area in 608 is gray and very little border shows darker gray, which can be interpreted that the image is from a real finger.

This image shows when a real finger, in normal condition, is placed on the fingerprint sensor. All three tests are passed, and the final result is PASSED. Specifically, the test result (1) for Test 1 is lower than its threshold (50), so this test is passed. The test result (0) for Test 2 is lower than its threshold (20), so this test is passed. The test result (56) for Test 3 is higher than its threshold (30), so this test is passed.

Figure 7:
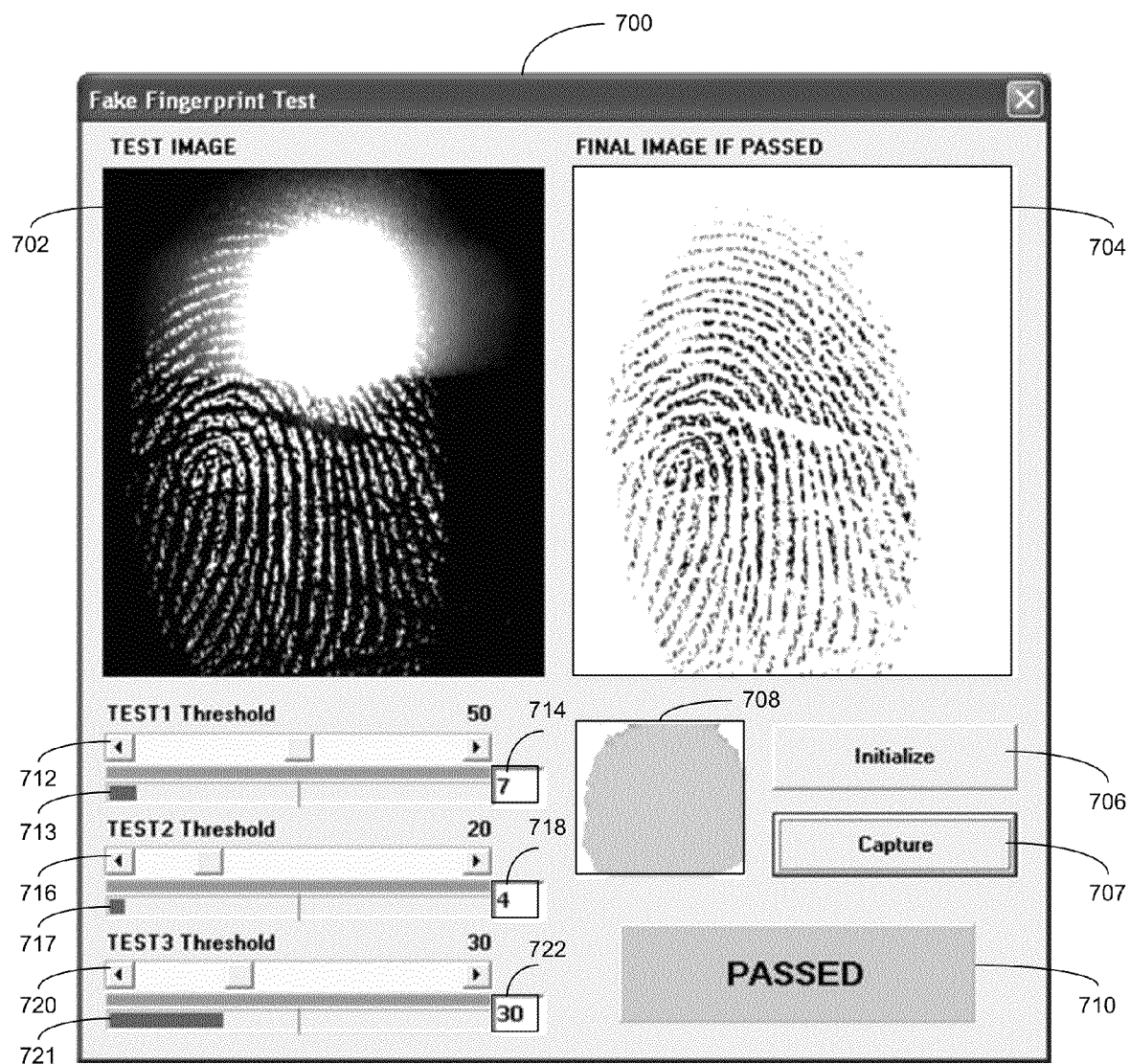

FIG. 7 illustrate yet another user interface used for fake fingerprint detection according to an embodiment of the present invention. In the implementation shown in FIG. 7, the user interface 700 includes a first window 702 for showing the test image, a second window 704 for showing the final image if it passed subsequent tests, an initialize button 706 for initializing the fingerprint detection process, a capture button 707 for manually capturing direct and inverse images of a fingerprint under test, a preview window 708 for showing an image of an area of the fingerprint under test, and a final result window 710 for showing a determination of the fingerprint detection tests.

The test image shown in the first window 702 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image is shown in the second window 704 displays the final fingerprint image captured from the fingerprint sensor when test results described below are successful.

In the example shown in FIG. 7, Test 1 measures the average of gray level difference between base image and the test image in test area. To pass this test, the result value has to be lower than the threshold value. A first adjustable sliding bar 712 is used to indicate the first predetermined threshold value set for Test 1. And the corresponding first sliding window 713 and numeric window 714 indicate the threshold level of the actual captured fingerprint image for Test 1. Test 2 measures the percentage of pixels on the captured fingerprint image darker than the base image in test area. To pass this test, the result value has to be lower than the threshold value. A second adjustable sliding bar 716 is used to indicate the second predetermined threshold value set for Test 2. And the corresponding second sliding window 717 and numeric window 718 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 720 is used to indicate the third predetermined threshold value set for Test 3. And the corresponding third sliding window 721 and numeric window 722 indicate the actual captured fingerprint image for Test 3.

As shown in this example, the initialize button 706 makes the connection and initializes the fingerprint sensor device. The capture button 707 captures an image from the fingerprint sensor and performs three different tests and displays the final result. The preview window 708 shows an image of an area of the fingerprint under test. The final result button 710 displays the final result that may indicate whether the fingerprint being tested is PASSED or REJECTED. All three tests have to be passed to receive the PASSED final result 710.

This image shows when a real finger, in dry condition, is placed on the fingerprint sensor. All three tests are passed, and the final result is PASSED. Specifically, the test result (7) for Test 1 is lower than its threshold (50), so this test is passed. The test result (4) for Test 2 is lower than its threshold (20), so this test is passed. The test result (30) for Test 3 is higher than its threshold (30), so this test is passed.

Figure 8:
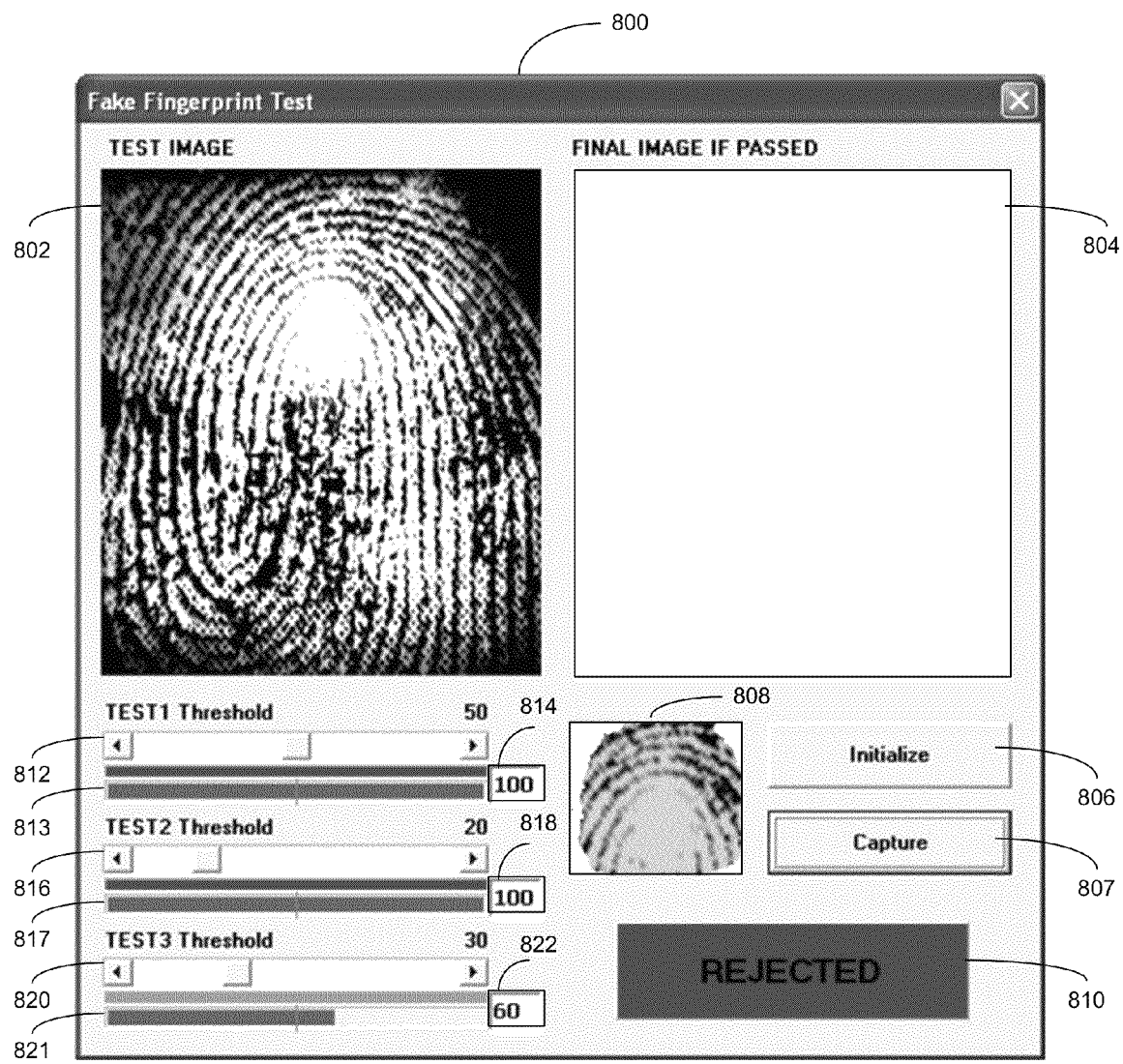

FIG. 8 illustrate yet another user interface used for fake fingerprint detection according to an embodiment of the present invention. In the implementation shown in FIG. 8, the user interface 800 includes a first window 802 for showing the test image, a second window 804 for showing the final image if it passed subsequent tests, an initialize button 806 for initializing the fingerprint detection process, a capture button 807 for manually capturing direct and inverse images of a fingerprint under test, a preview window 808 for showing an image of an area of the fingerprint under test, and a final result window 810 for showing a determination of the fingerprint detection tests.

The test image shown in the first window 802 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image is not shown in the second window 804 that displays the final fingerprint image captured from the fingerprint sensor because test results described below are not successful.

In the example shown in FIG. 8, Test 1 measures the average of gray level difference between base image and the test image in test area. To pass this test, the result value has to be lower than the threshold value. A first adjustable sliding bar 812 is used to indicate the first predetermined threshold value set for Test 1. And the corresponding first sliding window 813 and numeric window 814 indicate the threshold level of the actual captured fingerprint image for Test 1. Test 2 measures the percentage of pixels on the captured fingerprint image darker than the base image in test area. To pass this test, the result value has to be lower than the threshold value. A second adjustable sliding bar 816 is used to indicate the second predetermined threshold value set for Test 2. And the corresponding second sliding window 817 and numeric window 818 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 820 is used to indicate the third predetermined threshold value set for Test 3. And the corresponding third sliding window 821 and numeric window 822 indicate the actual captured fingerprint image for Test 3.

As shown in this example, the initialize button 806 makes the connection and initializes the fingerprint sensor device. The capture button 807 captures an image from the fingerprint sensor and performs three different tests and displays the final result. The preview window 808 shows an image of an area of the fingerprint under test. The final result button 810 displays the final result that may indicate whether the fingerprint being tested is PASSED or REJECTED. All three tests have to be passed to receive the PASSED final result 810.

This image shows when a fake finger (wet paper) is placed on the fingerprint sensor. Two tests are not passed in this case, and therefore the final result is REJECTED as shown in window 810. Specifically, the test result (100) of Test 1 is not lower than its threshold (50), so this test is not passed. The test result (100) of Test 2 is not lower than its threshold (20), so this test is not passed. The test result (60) of Test 3 is higher than its threshold (30), so this is passed. Since Test 1 and Test 2 are failed, the fingerprint is REJECTED as a result.

Figure 9:
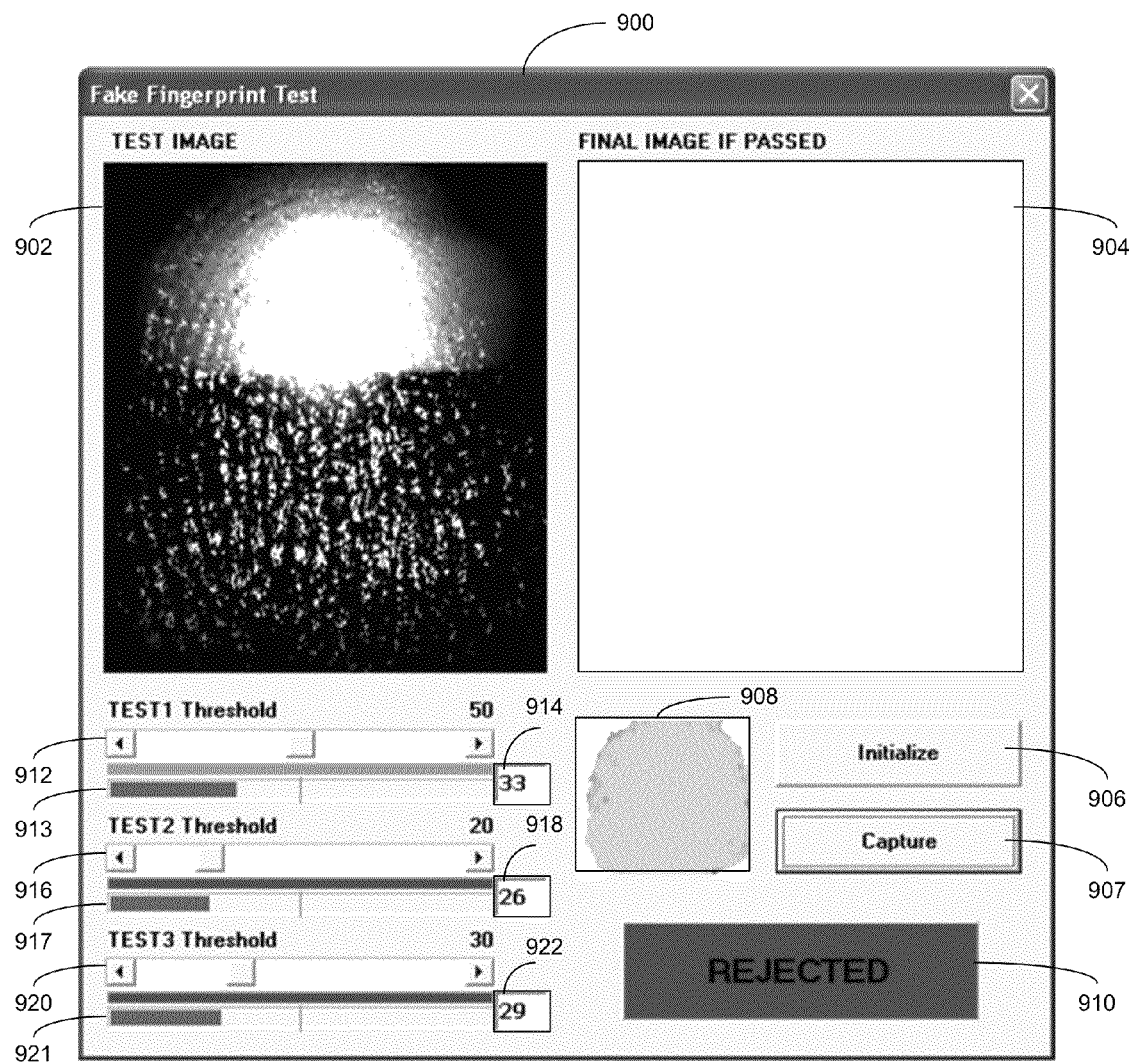

FIG. 9 illustrate yet another user interface used for fake fingerprint detection according to an embodiment of the present invention. In the implementation shown in FIG. 9, the user interface 900 includes a first window 902 for showing the test image, a second window 904 for showing the final image if it passed subsequent tests, an initialize button 906 for initializing the fingerprint detection process, a capture button 907 for manually capturing direct and inverse images of a fingerprint under test, a preview window 908 for showing an image of an area of the fingerprint under test, and a final result window 910 for showing a determination of the fingerprint detection tests.

The test image shown in the first window 902 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image is not shown in the second window 904 that displays the final fingerprint image captured from the fingerprint sensor because test results described below are not successful.

In the example shown in FIG. 9, Test 1 measures the average of gray level difference between base image and the test image in test area. To pass this test, the result value has to be lower than the threshold value. A first adjustable sliding bar 912 is used to indicate the first predetermined threshold value set for Test 1. And the corresponding first sliding window 913 and numeric window 914 indicate the threshold level of the actual captured fingerprint image for Test 1. Test 2 measures the percentage of pixels on the captured fingerprint image darker than the base image in test area. To pass this test, the result value has to be lower than the threshold value. A second adjustable sliding bar 916 is used to indicate the second predetermined threshold value set for Test 2. And the corresponding second sliding window 917 and numeric window 918 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 920 is used to indicate the third predetermined threshold value set for Test 3. And the corresponding third sliding window 921 and numeric window 922 indicate the actual captured fingerprint image for Test 3.

As shown in this example, the initialize button 906 makes the connection and initializes the fingerprint sensor device. The capture button 907 captures an image from the fingerprint sensor and runs three test points and displays the final result. The preview window 908 shows an image of an area of the fingerprint under test. The final result button 910 displays the final result that may indicate whether the fingerprint being tested is PASSED or REJECTED. All three tests have to be passed to receive the PASSED final result 910.

This image shows when a fake finger (lightly wet paper) is placed on the fingerprint sensor. Two tests are not passed, and therefore the final result is REJECTED as shown in window 910. Specifically, the test result (33) of Test 1 is lower than its threshold (50), so this test is passed. The test result (26) of Test 2 is not lower than its threshold (20), so this test is not passed. The test result (29) of Test 3 is not higher than its threshold (30), so this test is not passed. Since Test 2 and Test 3 are failed, the fingerprint is REJECTED as a result.

FIGS. 10-13 illustrate another series of user interfaces for controlling/using the fingerprint recognition device and communicating results of fingerprint recognition according to embodiments of the present invention.

Figure 10:
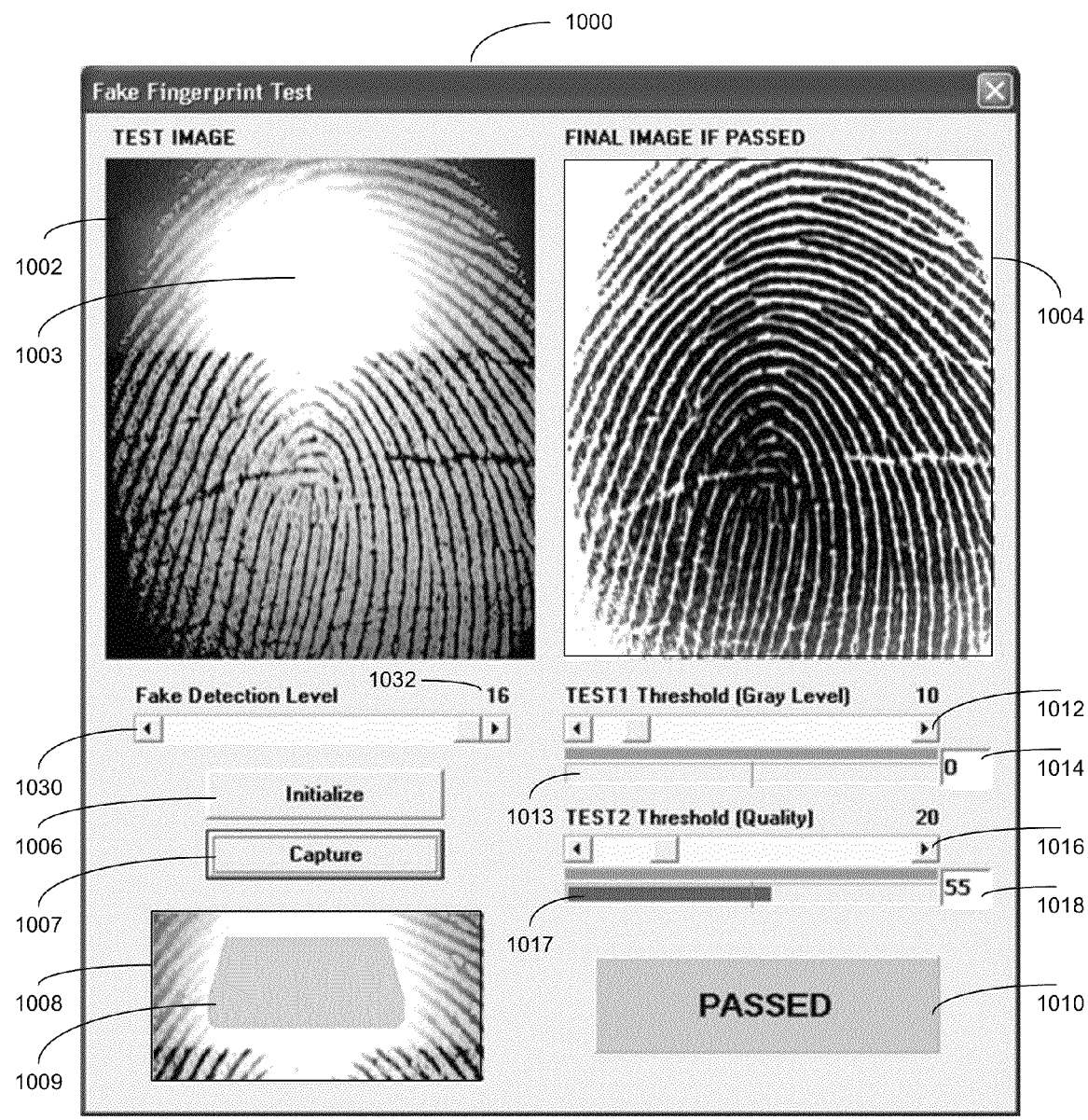
FIGS. 10-13 illustrate another series of user interfaces for controlling/using the fingerprint recognition device and communicating results of fingerprint recognition according to embodiments of the present invention.

In the implementation shown in FIG. 10, the user interface 1000 includes a first window 1002 for showing the test image, a second window 1004 for showing the final image if it passed subsequent tests, an initialize button 1006 for initializing the fingerprint detection process, a capture button 1007 for capturing direct and inverse images of a fingerprint under test, a preview window 1008 for showing an image of an area of the fingerprint under test, and a final result window 1010 for showing a determination of the fingerprint detection tests (PASSED or REJECTED). Both Test1 and Test2 described below have to be passed to receive a PASSED final result.

The test image shown in the first window 1002 displays the image captured from the fingerprint sensor for fake finger detection process. In this case, both IR LED 106 and light source 104 are turned on. The image derived from both IR LED 106 and light source 104 is gathered and used to analyze and determine if the image is captured from a real finger or fake finger. The final image is shown in the second window 1004 that displays the final fingerprint image captured from the fingerprint sensor when test results described below are successful.

In the example shown in FIG. 10, fake detection level sliding bar 1030 allows user to set a detection level (indicated by a number in window 1032), which the level is set at 16 in this example. The fake detection level 1032 can be configured to operate with any combination of the touch sensor 112 and the image sensor 120. For example, both the touch sensor 112 and the image sensor can be turned on, or one of the touch sensor 112 or the image sensor 120 can be turned on. The fake detection level can also be configured based on various security requirements, environmental, and other conditions. The various security levels can be set based on the security requirements for governmental, commercial, and personal applications. For example, the security level may be higher for governmental applications such as obtaining authorization to access a building, a room, or parts of an airport. The security level may be set for commercial applications such as obtaining authorization to access bank accounts, computer accounts, or other databases. The security level may be set lower for personal applications such as obtaining authorization to use personal electronic devices or obtaining authorization to enter a personal residence. In addition, various environmental conditions, such as temperature (taking into consideration of hot and cold conditions), and humidity (taking into consideration of dry and wet conditions) can be used to set the fake detection level 1030. Furthermore, the fake detection level can also be configured based on the skin colors of the fingerprints to be tested. In the example shown in FIG. 10, 16 detection levels are shown. Person skilled in the art would appreciate that different detection levels, such as 32, 64, and 128, can be created based on any combination of security requirements, environmental and other conditions described above.

Based on the fake detection level setting, an area 1009 (also referred to as the check area) within the preview window 1008 is determined during the initialization or calibration phase of the fingerprint detection process. The check area 1009 represents the area indicated by numeral 1003 in the first window 1002. A larger check area 1009 can be configured to correspond to a higher security fake detection level, and a smaller check area 1009 can be configured to correspond to a lower security fake detection level. In addition, the thresholds for both Test1 and Test 2 described below can also be adjusted based on the settings of the fake detection level 1030.

Test 1 measures the gray level difference between base image and the test image in test area. To pass this test, the result value has to be lower than the threshold value. A first adjustable sliding bar 1012 is used to indicate a first predetermined threshold value set for Test 1. And the corresponding first sliding window 1013 and numeric window 1014 indicate the threshold level of a captured fingerprint image for Test 1.

Test 2 measures the quality of fingerprint image for the area that is affected by light source 104, which represents the area in the bottom half of the first window 1002. To pass this test, the result value has to be higher than the threshold value. A second adjustable sliding bar 1016 is used to indicate a second predetermined threshold value set for Test 2. And the corresponding second sliding window 1017 and numeric window 1018 indicate the threshold of a captured fingerprint image for Test 2. In other embodiments, Test 2 may be configured to examine contrasts of neighboring pixel in areas between valleys and ridges of the fingerprint, and use this information to determine the validity of the fingerprint. In yet other embodiments, Test 2 may also be configured to examine ridge lines and valley lines formed by ridges and valleys in the fingerprint image, and use this information to determine the validity of the fingerprint. In yet other embodiments, Test 2 may also be configured to examine minutia features of the fingerprint to determine they actually exist. In particular, Test 2 may be configured to examine the minutia features of the fingerprint ridges, such as ridge ending, bifurcation, and short ridge (or dot). The ridge ending is the point at which a ridge terminates. Bifurcations are points at which a single ridge splits into two ridges. Short ridges (or dots) are ridges which are significantly shorter than the average ridge length on the fingerprint. Minutiae features and patterns can be useful in the analysis of fingerprints because no two fingers have been shown to be identical minutia features.

As shown in FIG. 10, the first window 1002 displays an image captured with both the IR LED 106 and light source 104 on. Note that the white portion 1003 on top center is lighted by both IR LED 106 and light source 104 and other area of window 1002 is lighted primarily by the light source 104. In this example, the white portion 1003 is used for image analysis in Test1, which is represented by the gray part in 1008. When illuminated by both light sources, if a real finger placed on the prism, the light source 104 generates a scattered light and which tends to create an inverse image of the fingerprint, for simplicity represented by 010101. While the IR LED 106 generates a direct light and which tends to create a direct image of the fingerprint, for simplicity represented by 101010. The combination of both images creates 010101+101010=111111. On the other hand, if a fake finger (for example a fingerprint on a piece of wet paper) is placed on the prism, both the IR LED 106 and light source 104 tend to create a direct image, 010101, and the image captured by the combination of the two lights would be 010101. In this manner, the fake fingerprint can be distinguished from the real fingerprint. Note that, for illustration purposes, 0s and 1s are used in the above explanation. In other implementations, different gray levels, for example 256 gray levels, from 0 to 255, may be used to represent each pixel. In the preview window 1008, gray color is used to represent the test area, where most area in 1008 is gray and very little border shows darker gray, which can be interpreted that the image is from a real finger.

This image shows when a real finger is placed on the fingerprint sensor, and with a fake detection level set at 16. Specifically, the test result (0) for Test 1 is lower than its threshold (10), so Test1 is passed. The test result (55) for Test 2 is higher than its threshold (20), so Test2 is passed. Since both Test1 and Test2 are passed, thus the final result is PASSED, as shown in 1010.

Figure 11:
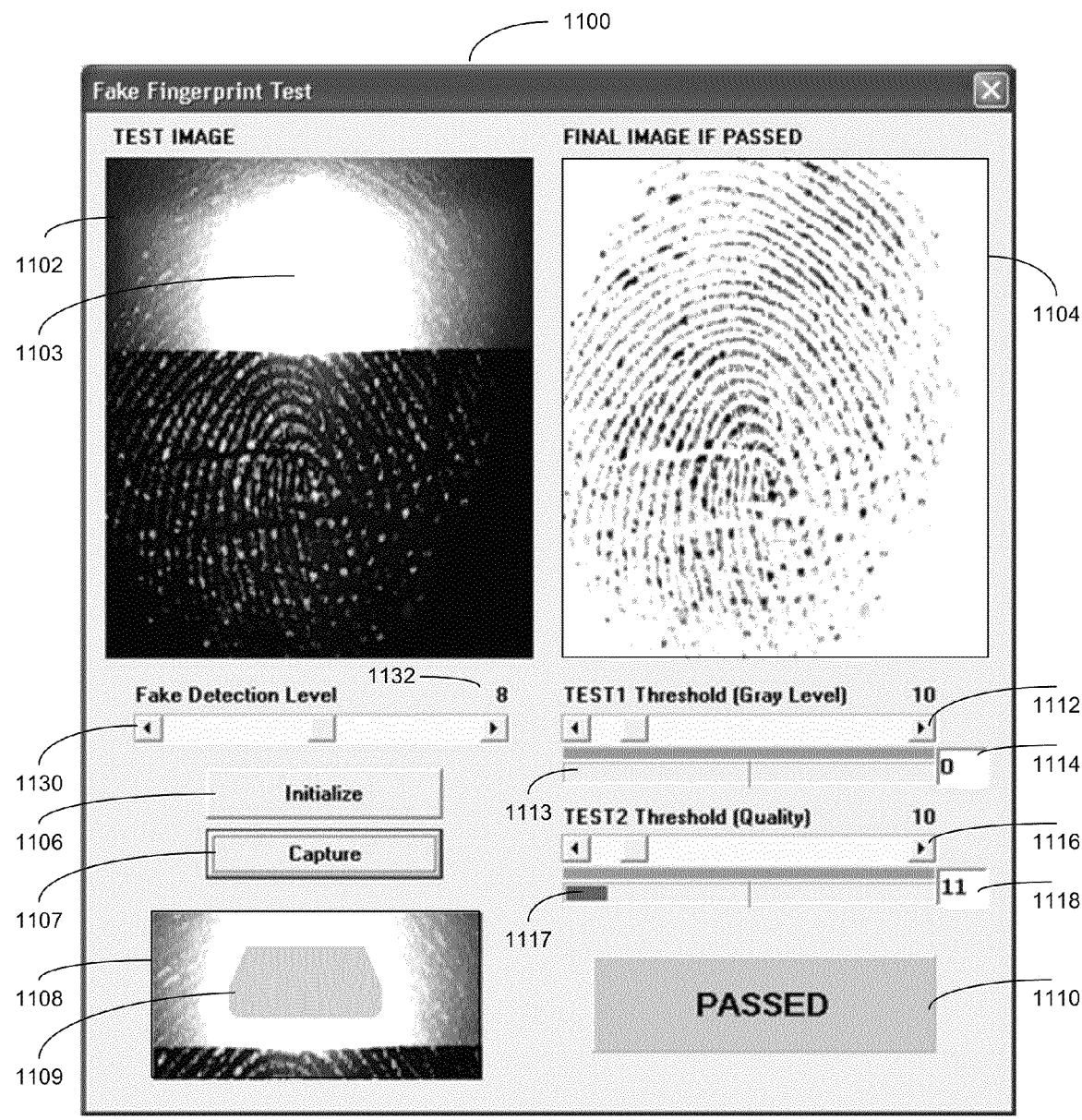

The user interface and methodologies employed in FIG. 11 are similar to that of FIG. 10. The user interface 1100 includes a first window 1102 for showing the test image, a second window 1104 for showing the final image if it passed subsequent tests, an initialize button 1106 for initializing the fingerprint detection process, a capture button 1107 for capturing direct and inverse images of a fingerprint under test, a preview window 1108 for showing an image of an area of the fingerprint under test, and a final result window 1110 for showing a determination of the fingerprint detection tests (PASSED or REJECTED). Both Test1 and Test2 described below have to be passed to receive a PASSED final result.

The test image shown in the first window 1102 displays the image captured from the fingerprint sensor for fake finger detection process. In this case, both IR LED 106 and light source 104 are turned on. The image derived from both IR LED 106 and light source 104 is gathered and used to analyze and determine if the image is captured from a real finger or fake finger. The final image is shown in the second window 1104 that displays the final fingerprint image captured from the fingerprint sensor when test results described below are successful.

In the example of FIG. 11, fake detection level sliding bar 1130 allows user to set a fake detection level (indicated by a number in window 1132). The fake detection level 1132 can be configured to operate with any combination of the touch sensor 112 and the image sensor 120. For example, both the touch sensor 112 and the image sensor can be turned on, or one of the touch sensor 112 or the image sensor 120 can be turned on. The fake detection level can also be configured based on various security requirements, environmental, and other conditions, which is set at 8 as shown in FIG. 11.

Based on the fake detection level setting, an area 1109 (also referred to as the check area) within the preview window 1108 is determined during the initialization or calibration phase of the fingerprint detection process. The check area 1109 represents the area indicated by numeral 1103 in the first window 1002. Comparing to the check area 1009 of FIG. 10, the check area 1109 is smaller because a lower fake detection level (8 in FIG. 11 as compared to 16 in FIG. 10) is selected for this test. In addition, the thresholds for both Test1 and Test 2 described below can also be adjusted based on the settings of the fake detection level 1132.

Test 1 measures the average of gray level difference between base image and the test image in test area. To pass this test, the result value has to be lower than the threshold value. A first adjustable sliding bar 1112 is used to indicate a first predetermined threshold value set for Test 1. And the corresponding first sliding window 1113 and numeric window 1114 indicate the threshold level of a captured fingerprint image for Test 1. Test 2 measures the quality of fingerprint image for the area that is affected by light source 104, which represents the area in the bottom half of the first window 1102. To pass this test, the result value has to be higher than the threshold value. A second adjustable sliding bar 1116 is used to indicate a second predetermined threshold value set for Test 2. And the corresponding second sliding window 1117 and numeric window 1118 indicate the threshold of a captured fingerprint image for Test 2.

This image shows when a real finger is placed on the fingerprint sensor, and with a fake detection level set at 8. Specifically, the test result (0) for Test 1 is lower than its threshold (10), so Test1 is passed. The test result (11) for Test 2 is higher than its threshold (10), so Test2 is passed. Since both Test1 and Test2 are passed, thus the final result is PASSED, as shown in 1110.

Figure 12:
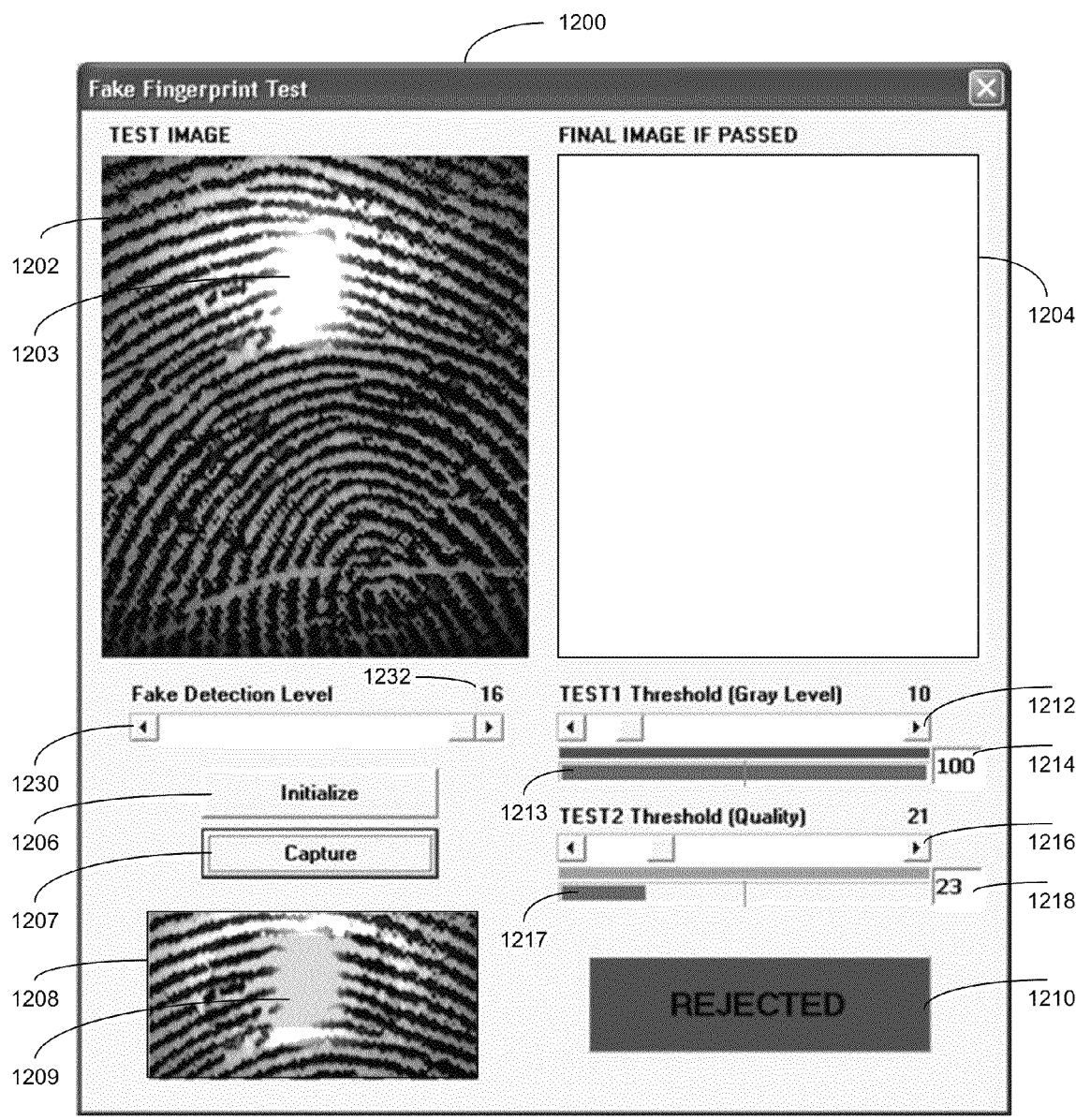

The user interface and methodologies employed in FIG. 12 are similar to that of FIG. 10. The user interface 1200 includes a first window 1202 for showing the test image, a second window 1204 for showing the final image if it passed subsequent tests, an initialize button 1206 for initializing the fingerprint detection process, a capture button 1207 for capturing direct and inverse images of a fingerprint under test, a preview window 1208 for showing an image of an area of the fingerprint under test, and a final result window 1210 for showing a determination of the fingerprint detection tests (PASSED or REJECTED). Both Test1 and Test2 described below have to be passed to receive a PASSED final result.

The test image shown in the first window 1202 displays the image captured from the fingerprint sensor for fake finger detection process. In this case, both IR LED 106 and light source 104 are turned on. The image derived from both IR LED 106 and light source 104 is gathered and used to analyze and determine if the image is captured from a real finger or fake finger. The final image would be shown in the second window 1204 that displays the final fingerprint image captured from the fingerprint sensor if test results described below were successful.

In the example of FIG. 12, fake detection level sliding bar 1230 allows user to set a fake detection level (indicated by a number in window 1232). The fake detection level 1232 can be configured to operate with any combination of the touch sensor 112 and the image sensor 120. For example, both the touch sensor 112 and the image sensor can be turned on, or one of the touch sensor 112 or the image sensor 120 can be turned on. The fake detection level can also be configured based on various security requirements, environmental, and other conditions, which is set at 16 as shown in FIG. 12.

Based on the fake detection level setting, an area 1209 (also referred to as the check area) within the preview window 1208 is determined during the initialization or calibration phase of the fingerprint detection process. The check area 1209 represents the area indicated by numeral 1203 in the first window 1202. In addition, the thresholds for both Test1 and Test 2 described below can also be adjusted based on the settings of the fake detection level 1232.

Test 1 measures the average of gray level difference between base image and the test image in test area. To pass this test, the result value has to be lower than the threshold value. A first adjustable sliding bar 1212 is used to indicate a first predetermined threshold value set for Test 1. And the corresponding first sliding window 1213 and numeric window 1214 indicate the threshold level of a captured fingerprint image for Test 1. Test 2 measures the quality of fingerprint image for the area that is affected by light source 104, which represents the area in the bottom half of the first window 1202. To pass this test, the result value has to be higher than the threshold value. A second adjustable sliding bar 1216 is used to indicate a second predetermined threshold value set for Test 2. And the corresponding second sliding window 1217 and numeric window 1218 indicate the threshold of a captured fingerprint image for Test 2.

This image shows when a fake finger represented by a sheet of fingerprint is placed on the fingerprint sensor, and with a fake detection level set at 16. Specifically, the test result (100) for Test 1 is higher than its threshold (10), so Test1 is failed. The test result (23) for Test 2 is higher than its threshold (21), so Test2 is passed. Since Test1 failed, the final result is REJECTED, as shown in 1210, and no image is displayed in window 1204.

Figure 13:
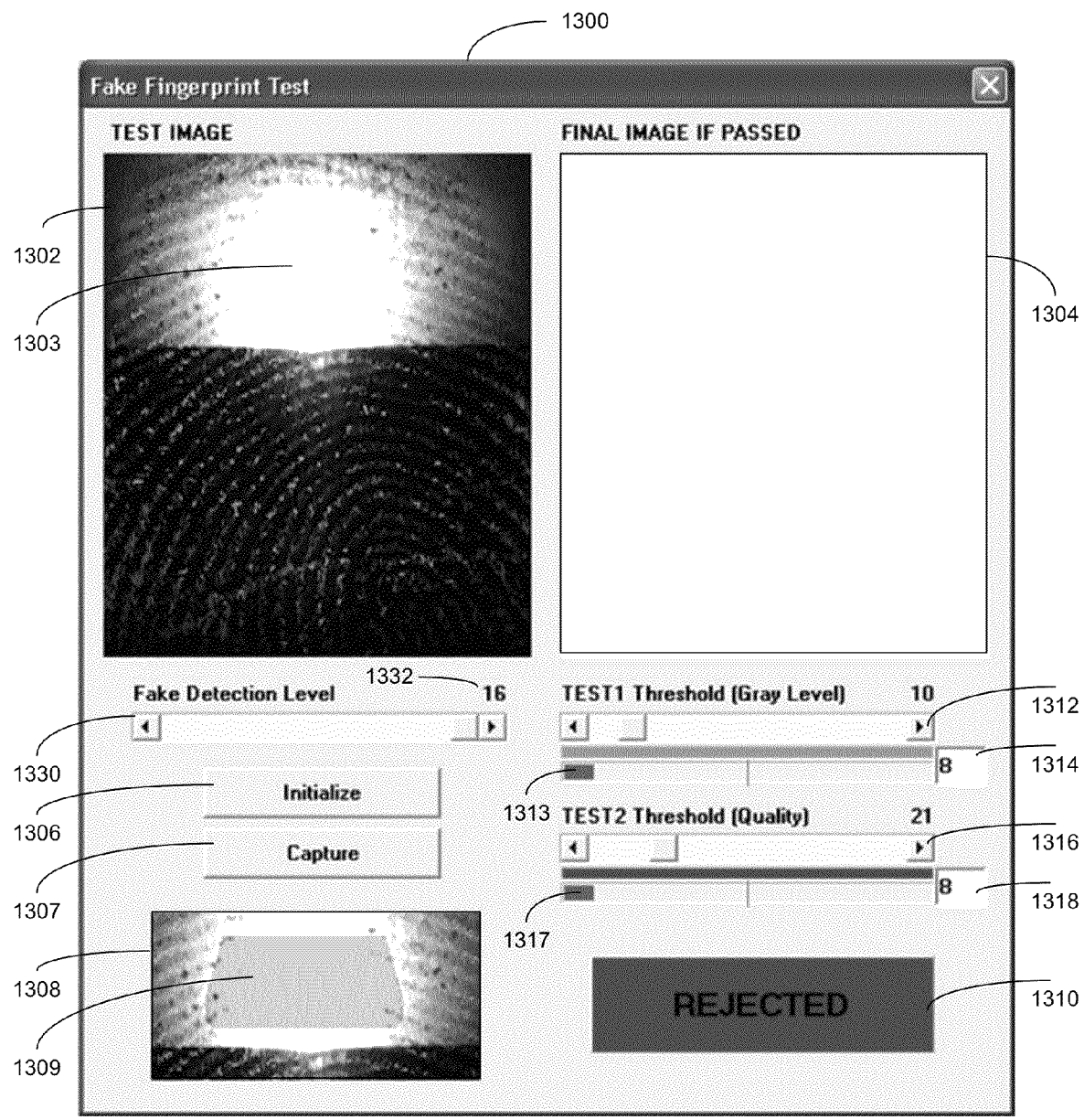

The user interface and methodologies employed in FIG. 13 are similar to that of FIG. 10. The user interface 1300 includes a first window 1302 for showing the test image, a second window 1304 for showing the final image if it passed subsequent tests, an initialize button 1306 for initializing the fingerprint detection process, a capture button 1307 for capturing direct and inverse images of a fingerprint under test, a preview window 1308 for showing an image of an area of the fingerprint under test, and a final result window 1310 for showing a determination of the fingerprint detection tests (PASSED or REJECTED). Both Test1 and Test2 described below have to be passed to receive a PASSED final result.

The test image shown in the first window 1302 displays the image captured from the fingerprint sensor for fake finger detection process. In this case, both IR LED 106 and light source 104 are turned on. The image derived from both IR LED 106 and light source 104 is gathered and used to analyze and determine if the image is captured from a real finger or fake finger. The final image would be shown in the second window 1304 that displays the final fingerprint image captured from the fingerprint sensor if test results described below were successful.

In the example of FIG. 13, fake detection level sliding bar 1330 allows user to set a fake detection level (indicated by a number in window 1332). The fake detection level 1332 can be configured to operate with any combination of the touch sensor 112 and the image sensor 120. For example, both the touch sensor 112 and the image sensor can be turned on, or one of the touch sensor 112 or the image sensor 120 can be turned on. The fake detection level can also be configured based on various security requirements, environmental, and other conditions, which is set at 16 as shown in FIG. 13.

Based on the fake detection level setting, an area 1309 (also referred to as the check area) within the preview window 1308 is determined during the initialization or calibration phase of the fingerprint detection process. The check area 1309 represents the area indicated by numeral 1303 in the first window 1302. In addition, the thresholds for both Test1 and Test 2 described below can also be adjusted based on the settings of the fake detection level 1332.

Test 1 measures the average of gray level difference between base image and the test image in test area. To pass this test, the result value has to be lower than the threshold value. A first adjustable sliding bar 1312 is used to indicate a first predetermined threshold value set for Test 1. And the corresponding first sliding window 1313 and numeric window 1314 indicate the threshold level of a captured fingerprint image for Test 1. Test 2 measures the quality of fingerprint image for the area that is affected by light source 104, which represents the area in the bottom half of the first window 1302. To pass this test, the result value has to be higher than the threshold value. A second adjustable sliding bar 1316 is used to indicate a second predetermined threshold value set for Test 2. And the corresponding second sliding window 1317 and numeric window 1318 indicate the threshold of a captured fingerprint image for Test 2.

This image shows when a fake finger represented by a sheet of fingerprint is placed on the fingerprint sensor, and with a fake detection level set at 16. Specifically, the test result (8) for Test 1 is lower than its threshold (10), so Test1 is passed. The test result (8) for Test 2 is lower than its threshold (21), so Test2 is failed. Since Test2 failed, the final result is REJECTED, as shown in 1310, and no image is displayed in window 1304.

It will be appreciated that the above descriptions for clarity have described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for determining validity of a fingerprint, comprising:
providing a prism having a first side configured to be touched by a fingerprint;
providing an IR LED located near a second side of the prism;
providing a light source located near a third side of the prism;
providing an IR filter located between the IR LED and the second side of the prism, wherein the IR filter is configured to allow light generated by the IR LED to pass through, and to block light having wavelength not in the IR range from passing through;
illuminating both the IR LED and the light source simultaneously to produce a captured image of the fingerprint;
storing the captured image of the fingerprint for analysis; and
determining validity of the fingerprint using the captured image.

2. The method of claim 1 further comprising:
providing a touch pad and a touch sensor configured to detect conductivity information of a finger that touches the first side of the prism; and
determining validity of the fingerprint using the conductivity information.

3. The method of claim 1, wherein a portion of the captured image is formed with a direct image of the fingerprint illuminated by direct light from the IR LED and an inverse image of the fingerprint illuminated by scattered light from the light source.

4. The method of claim 1, wherein determining validity of the fingerprint comprises:
examining gray level value of a first portion of the captured image, wherein the first portion of the captured image is formed with a direct image of the fingerprint illuminated by direct light from the IR LED and an inverse image of the fingerprint illuminated by scattered light from the light source;
comparing the gray level value to a first predetermined threshold value; and determining the fingerprint being valid if the gray level value is lower than the first predetermined threshold value.

5. The method of claim 4, wherein determining validity of the fingerprint further comprises:
examining an average gray level value of a second portion of the captured image, wherein the second portion of the captured image is formed with scattered light from the light source;
comparing the average gray level value to a second predetermined threshold value; and
determining the fingerprint being valid if the average gray level value of the second portion of the captured image is higher than the second predetermined threshold value.

6. The method of claim 1, wherein determining validity of the fingerprint further comprises:
examining contrasts of neighboring pixels in areas between valleys and ridges of the fingerprint; and
determining validity of the fingerprint using contrasts of neighboring pixels in areas between valleys and ridges of the fingerprint.

7. The method of claim 1, wherein determining validity of the fingerprint further comprises:
examining ridge lines and valley lines of the fingerprint; and
determining validity of the fingerprint using the ridge lines and valley lines of the fingerprint.

8. The method of claim 1, wherein determining validity of the fingerprint further comprises:
examining minutia features of the fingerprint, wherein the minutia features include ridge endings, bifurcations, and short ridges; and
determining validity of the fingerprint using the minutia features of the fingerprint.

9. The method of claim 1, wherein determining validity of the fingerprint further comprising:
providing a fake detection level setting, wherein the fake detection level setting includes settings for security requirements, settings for variations in environmental conditions, and settings for variations in skin colors of the fingerprint; and
determining validity of the fingerprint in accordance with the fake detection level setting.

10. The method of claim 9, wherein settings for security requirements include at least one of governmental, commercial, and personal application.

11. An apparatus for determining validity of a fingerprint, comprising:
a prism having a first side configured to be touched by a fingerprint;
an IR LED located near the second side of the prism;
an IR filter located between the IR LED and the second side of the prism, wherein the IR filter is configured to allow light generated by the IR LED to pass through, and to block light having wavelength not in the IR range from passing through;
a light source located near the third side of the prism, wherein both the IR LED and the light source are configured to illuminate the fingerprint simultaneously to produce a captured image of the fingerprint;
one or more lenses configured to direct the captured image of the fingerprint for storage;
one or more CMOS sensors configured to collect the captured image of the fingerprint for analysis; and
a controller configured to determine validity of the fingerprint using the captured image.

12. The apparatus of claim 11, further comprises:
a touch pad and a touch sensor configured to detect conductivity information of a finger that touches the prism, wherein the conductivity information is used by the controller to determine validity of the fingerprint.

13. The apparatus of claim 11 further comprises:
a user interface, wherein the user interface includes an initialize button configured to initial a fingerprint detection process, and a capture button configured to capture a direct image and an inverse image of the fingerprint, wherein the direct image and the inverse image form the captured image of the fingerprint.

14. The apparatus of claim 13, wherein the user interface further comprises:
a first display window configured to show the captured image of the fingerprint;
a second window display configured to show a second image of the fingerprint illuminated by the light source in response to the fingerprint is determined to be valid; and
a third window display configured to show a result of the fingerprint detection.

15. The apparatus of claim 14, wherein the user interface further comprises:
a detection level setting configured to set a detection level in accordance with security requirements, environmental conditions, and skin color of the fingerprint under test;
a first test threshold setting configured to set an average gray level difference of an area of the test image illuminated by both the IR LED and the light source; and
a second test threshold setting configured to set an average gray level of an area of the test image illuminated by the light source.

16. The apparatus of claim 15, wherein the detection level setting includes a detection level sliding bar configured to select the detection level and a first detection level window configured to display the detection level selected.

17. The apparatus of claim 15, wherein the detection level is selected based on at least one of skin color of fingerprint, security requirements, and environmental conditions.

18. The apparatus of claim 15, wherein
the first test threshold setting includes a first sliding bar configured to select a first threshold value for a first test, a first window configured to display the first threshold value selected for the first test; and
the second test threshold setting includes a second sliding bar configured to select a second threshold value for a second test, a second window configured to display the second threshold value selected for the second test.

* * * * *